United States Patent [19]
Dowell et al.

[11] Patent Number: 5,899,958
[45] Date of Patent: * May 4, 1999

[54] LOGGING WHILE DRILLING BOREHOLE IMAGING AND DIPMETER DEVICE

[75] Inventors: Iain Alexander Dowell; Douglas Donald Seiler, both of Houston; Patrick Leon York, Katy, all of Tex.

[73] Assignee: Halliburton Energy Services, Inc., Houston, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/526,171

[22] Filed: Sep. 11, 1995

[51] Int. Cl.$^6$ ................................................ E21B 49/00
[52] U.S. Cl. ........................... 702/6; 73/152.02; 175/50; 702/11
[58] Field of Search ...................... 73/152.02, 152.03, 73/152.54; 175/40, 45, 50; 181/102, 104; 250/254; 324/323, 346, 369; 340/853.1; 364/422; 367/25, 33, 81, 83, 911, 912; 702/6, 7, 8, 11, 14, 16

[56] References Cited

U.S. PATENT DOCUMENTS

| Re. 35,386 | 12/1996 | Wu et al. | 175/45 |
|---|---|---|---|
| 2,650,067 | 8/1953 | Martin | 175/50 |
| 2,755,431 | 7/1956 | Scherbatskoy | 324/323 |
| 2,755,432 | 7/1956 | Arps et al. | 324/369 |
| 2,910,133 | 10/1959 | Hudson et al. | 367/82 |
| 2,941,784 | 6/1960 | Martin | 324/369 |
| 3,237,153 | 2/1966 | Blizard | 367/197 X |
| 3,312,934 | 4/1967 | Stripling et al. | 367/27 |
| 3,593,255 | 7/1971 | White | 367/25 |
| 4,297,879 | 11/1981 | Howells et al. | 73/152.02 |
| 4,346,593 | 8/1982 | Howells et al. | 73/152.02 |
| 4,581,584 | 4/1986 | Baldwin | 324/338 |
| 4,649,252 | 3/1987 | Obara | 219/69.12 |

(List continued on next page.)

OTHER PUBLICATIONS

J. Labo, *A Practical Introduction to Borehole Geophysics* (Society of Exploration Geophysicists 1986).

D.R. Skinner, *Introduction to Petroleum Production*, vol. 1, at 54–63 (Gulf Publishing Co. 1981).

Olsen, "Potential of MWD Tools," *Euroil*, Mar. 1993, pp. 17–18.

J.R. Birchak, et al. "Standoff and Caliper Measurements While Drilling Using a New Formation–Evaluation Tool with Three Ultrasonic Transducers," Society of Petroleum Engineers (1995).

(List continued on next page.)

*Primary Examiner*—Edward R. Cosimano
*Attorney, Agent, or Firm*—Conley, Rose & Tayon

[57] ABSTRACT

A LWD tool is disclosed for providing an image of the borehole during drilling or during removal of the tool from the borehole. The tool includes imaging transducers which are fired based upon either time or direction. Borehole reflections are processed to determine time-of-flight to give an indication of standoff with respect to each transducer from which the borehole geometry can be obtained. The reflections also are analyzed for other information, such as the amplitude of the reflected signal. The time-of-flight and amplitude values are encoded and stored in memory for retrieval later. In addition to the imaging transducers, the imaging assembly also includes depth transducers to obtain a micro measurement of depth downhole. The micro-depth measurements are stored and/or transmitted to the surface. In addition, a directional sensor and clock are provided downhole to correlate the firing of the transducers and the receipt of reflections. The micro-depth measurements and directional measurements preferably are used with one more image signals to check for the presence of bed boundaries intersecting the borehole. If a boundary is present, the imaging assembly applies a best fit sine wave to the image signal, from which dip angle $\alpha$ and dip direction are obtained. In the preferred embodiment, acoustic transducers are used as the imaging transducers, although electromagnetic transducers or other suitable transducers may be used.

60 Claims, 7 Drawing Sheets

U.S. PATENT DOCUMENTS

| | | | |
|---|---|---|---|
| 4,718,046 | 1/1988 | Medlin | 367/31 |
| 4,869,349 | 9/1989 | Minear et al. | 181/102 |
| 4,930,109 | 5/1990 | Kyle | 367/27 |
| 4,945,761 | 8/1990 | Lessi et al. | 73/152.47 |
| 4,962,490 | 10/1990 | Lyle et al. | 367/35 |
| 5,045,795 | 9/1991 | Gianzero et al. | 324/342 |
| 5,064,006 | 11/1991 | Waters et al. | 175/45 |
| 5,069,308 | 12/1991 | Yin et al. | 181/106 |
| 5,107,705 | 4/1992 | Wraight et al. | 73/152.03 |
| 5,146,050 | 9/1992 | Strozeski et al. | 181/102 |
| 5,160,925 | 11/1992 | Dailey et al. | 340/853.3 |
| 5,200,705 | 4/1993 | Clark et al. | 324/338 |
| 5,230,386 | 7/1993 | Wu et al. | 175/45 |
| 5,237,539 | 8/1993 | Selman | 367/69 |
| 5,318,137 | 6/1994 | Johnson et al. | 175/40 |
| 5,318,138 | 6/1994 | Dewey et al. | 175/74 |
| 5,332,048 | 7/1994 | Underwood et al. | 175/26 |
| 5,459,697 | 10/1995 | Chin et al. | 367/81 |
| 5,511,037 | 4/1996 | Randall et al. | 367/33 |
| 5,519,668 | 5/1996 | Montaron | 367/35 |
| 5,586,084 | 12/1996 | Barron et al. | 367/85 |

OTHER PUBLICATIONS

"Sonic While Drilling —Real–Time Data to Guide Real–Time Decisions," Schlumberger Oilfield Services catalogue.

M. Greenspan, et al. "Tables of the Speed of Sound in Water," *J. Acoust. Soc. Am.*, vol. 31, No. 1 (Jan. 1959).

C.C. Leroy, "Development of Simple Equations for Accurate and More Realistic Calculation of the Speed of Sound in Sea Water," *J. Acoust. Soc. Am.*, vol. 46 (1969).

A.L. Podio, et al. "Ultrasonic Velocity and Attenuation Measurements in Water–Based Drilling Muds," ASME Drilling Technology Symposium, PD vol. 27 (Jan. 14–18, 1990).

Schlumberger Anadrill brochure: "Take your drilling in all directions with Anadrill," undated.

Schlumberger Anadrill brochure: "This is Anadrill's Drilling Image; So Is This (The Industry's Only Resistivity Imaging While Drilling)," undated.

Halliburton Logging Services, Inc. brochure: "CAST* Light On The Hole Picture," dated Aug. 1989.

Halliburton Logging Services, Inc. catalog: "Open Hole Services," dated Feb. 1992.

G.L. Moake, J.R. Birchak, R.G. Matthews and W.E. Schultz, Halliburton Energy Services, "Standoff and Caliper Measurements While Drilling Using a New Formation–Evaluation Tool with Three Ultrasonic Transducers," *Society of Petroleum Engineers* SPE 26494, copyright 1995.

David Patrick Murphy, Shell E&P Co., "Advances in MWD and formation evaluation for 1995," *World Oil*, Mar. 1995.

"Tool Images Formation While Drilling," *Petroleum Engineer International*, May 1995.

*Introduction to Petroleum Production*, pp. 8–36.

LOGGING WHILE DRILLING BOREHOLE IMAGING AND DIPMETER DEVICE

BACKGROUND OF THE INVENTION

The present invention relates generally to a system for compiling an image of a wellbore wall with a bottomhole drilling assembly. More particularly, the invention relates to a bottomhole drilling assembly that includes a logging while drilling ("LWD") sub-system for determining characteristics of the borehole and formation during the drilling of a well, and correlating that information with depth to produce an image of some desired portion of the borehole. Still more particularly, the present invention relates to a device that provides an image of the borehole as part of an LWD tool, and which also can be used as a device to determine other formation parameters such as formation dip angle.

Modern petroleum drilling and production operations demand a great quantity of information relating to parameters and conditions downhole. Such information typically includes characteristics of the earth formations traversed by the wellbore, in addition to data relating to the size and configuration of the borehole itself. The collection of information relating to conditions downhole, which commonly is referred to as "logging," can be performed by several methods. Logging has been known in the industry for many years as a technique for providing information regarding the particular earth formation being drilled. In conventional oil well wireline logging, a probe or "sonde" is lowered into the borehole after some or all of the well has been drilled, and is used to determine certain characteristics of the formations traversed by the borehole. The sonde may include one or more sensors to measure parameters downhole and typically is constructed as a hermetically sealed steel cylinder for housing the sensors, which hangs at the end of a long cable or "wireline." The cable or wireline provides mechanical support to the sonde and also provides an electrical connection between the sensors and associated instrumentation within the sonde, and electrical equipment located at the surface of the well. Normally, the cable supplies operating power to the sonde and is used as an electrical conductor to transmit information signals from the sonde to the surface, and control signals from the surface to the sonde. In accordance with conventional techniques, various parameters of the earth's formations are measured and correlated with the position of the sonde in the borehole, as the sonde is pulled uphole.

The sensors used in a wireline sonde may include a source device for transmitting energy into the formation, and one or more receivers for detecting the energy reflected from the formation. Various sensors have been used to determine particular characteristics of the formation, including nuclear sensors, acoustic sensors, and electrical sensors. See generally J. Labo, *A Practical Introduction to Borehole Geophysics* (Society of Exploration Geophysicists 1986); D. R. Skinner, *Introduction to Petroleum Production,* Volume 1, at 54–63 (Gulf Publishing Co. 1981).

For an underground formation to contain petroleum, and for the formation to permit the petroleum to flow through it, the rock comprising the formation must have certain well known physical characteristics. One characteristic is that the rock in the formation have space to store petroleum. If the rock in a formation has openings, voids, and spaces in which oil and gas may be stored, it is characterized as "porous." Thus, by determining if the rock is porous, one skilled in the art can determine whether or not the formation has the requisite physical properties to store and yield petroleum. See D. R. Skinner, *Introduction to Petroleum Production,* id. at 8.

Acoustic sensors are commonly used to measure porosity of the formation by determining the amount of time it takes the acoustic wave to travel through the formation. The porosity of the formation through which the acoustic wave travels influences the speed of sound in that formation. By determining the speed of sound of a formation, valuable insight can be obtained regarding formation porosity and other formation characteristics. Examples of acoustic wireline tools are U.S. Pat. Nos. 3,237,153, 3,312,934, 3,593, 255, 4,649,525, 4,718,046, 4,869,349, and 5,069,308. Typically, the acoustic wireline tools include one or more acoustic transmitters and one or more acoustic receivers. Acoustic waves are generated by the transmitter(s) and are transmitted into the formation adjacent the wellbore. The acoustic signals are refracted back to the receivers, and a travel time for the wave is determined, typically at the surface of the well. From this travel time, and knowing the spacing between the receivers, speed of sound of the formation can be calculated, which then can be used to provide an indication of formation porosity according to known techniques. See generally J. Labo, *A Practical Introduction to Borehole Geophysics,* Chapter 10 (Society of Exploration Geophysicists 1986).

Acoustic logging tools also have been used by the assignee of the present invention as a wireline imaging device. See Open Hole Services, (Halliburton Logging Services 1992), p. 28. This device is commonly referred to as the Circumferential Acoustic Scanning Tool (or CAST). As the sonde is pulled up the borehole, an acoustic transducer is rotated at a high speed (on the order of 10 revolutions per second). During each rotation, the acoustic transducer is fired based upon its relative rotational bearing. Thus, the radial directions are divided into a plurality of finite points (on the order of 200 points), and the transducer is fired at each point. Reflections are received by the transducer, and the amplitude and time-of-flight of the reflected signal is computed and transmitted via the wireline to the surface for processing. If the transducer is fired 200 times per revolution, and the transducer is rotated 10 times per second, then the transducer is fired 2000 times per second, and receives 2000 reflected signals in one second. The reflected signals from the wireline imaging device are used to produce rotational image logs, as well as borehole caliper measurements and/or standoff measurements using two-way time-of-flight of a pulse-echo signal (with an assumed mud slowness).

While wireline logging is useful in assimilating information relating to formations downhole, it nonetheless has certain disadvantages. For example, before the wireline logging tool can be run in the wellbore, the drillstring and bottomhole assembly must first be removed or tripped from the borehole, resulting in considerable cost and loss of drilling time for the driller (who typically is paying daily fees for the rental of drilling equipment). In addition, because wireline tools are unable to collect data during the actual drilling operation, drillers must at times make decisions (such as the direction to drill, etc.) possibly without sufficient information, or else incur the cost of tripping the drillstring to run a logging tool to gather more information relating to conditions downhole. In addition, because wireline logging occurs a relatively long period after the wellbore is drilled, the accuracy of the wireline measurement can be questionable. As one skilled in the art will understand, the wellbore conditions tend to degrade as drilling fluids invade the formation in the vicinity of the wellbore. In addition, the borehole shape may begin to degrade, reducing the accuracy of the measurements.

Because of these limitations associated with wireline logging, there recently has been an increasing emphasis on the collection of data during the drilling process itself. By collecting and processing data during the drilling process, without the necessity of tripping the drilling assembly to insert a wireline logging tool, the driller can make accurate modifications or corrections "real-time", as necessary, to optimize drilling performance. For example, the driller may change the weight-on-bit to cause the bottomhole assembly to tend to drill in a particular direction, or, if a steerable bottomhole assembly is used, may operate in the sliding mode to effect source corrections. Moreover, the measurement of formation parameters during drilling, and hopefully before invasion of the formation, increases the usefulness of the measured data. Further, making formation and borehole measurements during drilling can save the additional rig time which otherwise would be required to run a wireline logging tool.

Designs for measuring conditions downhole and the movement and location of the drilling assembly, contemporaneously with the drilling of the well, have come to be known as "measurement-while-drilling" techniques, or "MWD." Similar techniques, concentrating more on the measurement of formation parameters of the type associated with wireline tools, commonly have been referred to as "logging while drilling" techniques, or "LWD." While distinctions between MWD and LWD may exist, the terms MWD and LWD often are used interchangeably. For the purposes of this disclosure, the term LWD will be used with the understanding that the term encompasses both the collection of formation parameters and the collection of information relating to the position of the drilling assembly while the bottomhole assembly is in the well.

The measurement of formation properties during drilling of the well by LWD systems improves the timeliness of measurement data and, consequently, increases the efficiency of drilling operations. Typically, LWD measurements are used to provide information regarding the particular formation in which the borehole is traversing. During the last several years, many in the industry have noted the desirability of an LWD system that could be especially used to detect bed boundaries and to provide real-time data to the driller to enable the driller to make directional corrections to stay in the pay zone. See, e.g. Olsen, "Potential of MWD Tools," Euroil, March 1993, pp. 17–18. Alternatively, the LWD system could be used as part of a "Smart" system to automatically maintain the drill bit in the pay zone. See, e.g. commonly assigned U.S. Pat. No. 5,332,048, the teachings of which are incorporated by reference herein. The assignee has also developed a system which permits the measurement of LWD data at the drill bit to provide an earlier indication of bed boundaries and formation characteristics. See U.S. Pat. No. 5,160,925. The use of an LWD system with these other systems makes it possible to conduct at least certain portions of drilling automatically.

Currently, logging sensors that commonly are used as part of an LWD system are resistivity and gamma ray sensors. Some in the industry have begun offering imaging systems based upon resistivity measurements. See the IDEAL system brochures published by Schlumberger. Acoustic measurement devices currently are being experimented with and implemented by the assignee and other companies for use in LWD systems to calculate a correction factor for other LWD measurements, and to determine formation speed of sound. See, e.g. commonly assigned U.S. patent application Ser. No. 08/430,822, now allowed entitled "Standoff Compensation for Acoustic Logging While Drilling Systems." The primary goal of acoustic measurements in LWD systems is to develop additional data relating to formation porosity by determining the formation speed of sound, which corresponds to measurements obtained by wireline logging. See "Sonic While Drilling—Real-Time Data to Guide Real-Time Decisions," Schlumberger Oilfield Services catalogue. The implementation of acoustic logging tools in a LWD system, however, is complicated as compared to a wireline tool because of the presence of extraneous drilling noise downhole. Thus, the noise generated by the drilling assembly, the flow of mud through the drillstring, the grinding of the drilling components, and other mechanical and environment noises present downhole make it difficult for the acoustic transducers to receive the transmitted acoustic wave and to isolate the received acoustic waveform from the extraneous noise that also is detected by the acoustic receiver. As a result, to date, acoustic sensors have had a very limited application in LWD systems.

Until very recently, imaging devices only have been available in wireline logging tools. Imaging devices have not been used extensively downhole for a myriad of reasons. One problem with implementing an LWD imaging tool is that the images must be stored downhole, and cannot be transmitted to the surface as quickly as is done in wireline logging because of the manner in which data is transmitted in LWD systems. The images require a massive amount of memory storage space. A second problem with LWD imaging relates to depth measurements. In wireline logging, depth can be tracked with better resolution than is available in the drilling process because more precise depth measurements are available for use with wireline devices than with LWD systems. Because of the problem with depth measurements during drilling, there is a great concern that LWD images will be smeared, or must be time correlated instead of depth correlated. A third concern with LWD imaging relates to the limitations on processing downhole, which results in an under-utilization of the imaged data until it can be retrieved at the surface.

While the advantages of determining borehole images during drilling are immediately apparent to one skilled in the art, to date no one has successfully implemented such a system which overcomes the limitations listed above.

SUMMARY OF THE INVENTION

The present invention solves the shortcomings and deficiencies of the prior art by implementing an LWD system for providing an image of the borehole during drilling or during removal of the bottomhole assembly from the wellbore. A downhole processor is provided as part of the LWD system that receives information relating to standoff distance from a transducer, and which uses this information to generate an image of the geological features of the borehole, as expressed on the borehole wall. The standoff distance is determined by measuring the two-way, round-trip, time-of-flight of certain acoustic signals and calculating a distance using the speed of sound through the drilling fluid. In the preferred embodiment, an array of imaging transducers are spaced equidistantly around the circumference of the logging tool to determine standoff distance in three directions to provide a more accurate indication of the borehole shape. The borehole shape, and the position of the logging tool in the borehole, may be used to center the reference point for the measurement in the center of the borehole through the use of software algorithms, to correct for anomalies that may otherwise exist in LWD measurements. A directional sensor also is preferably provided downhole to correlate the sensor signals, and thus the borehole configuration, to real-world coordinates relating to the horizontal and geographical North.

The amplitude of the signals obtained from the imaging transducers also preferably is received by the downhole processor and used to determine certain formation characteristics. In the preferred embodiment, the amplitude signals from the imaging transducers are stacked over a predetermined distance or time interval to minimize the amount of memory required to store the images. Thus, in an exemplary embodiment where a micro-measurement of distance is maintained downhole, all of the signals from the acoustic imaging transducers are stacked every ⅓", which conforms to the resolution of acoustic sensors.

The amplitude of the signals obtained from the imaging transducers also may be used to measure certain critical formation parameters and to provide a real-time indication to the driller. Thus, according to an exemplary embodiment of the present invention, a dedicated downhole processor may be provided which analyzes the reflected borehole signals for formation boundaries. If a boundary is detected intersecting the borehole, the processor prepares a 2-D model of the boundary by preparing a best-fit sine wave to the boundary image signal, graphed rotationally, and from this model, the processor calculates the amplitude and slope of the sine wave. Alternatively, the processor defines each imaged point in a three dimensional space, and fits a plane to the three-dimensional data. The amplitude and slope of the modeled plane or sine wave then is used to derive a dip angle a for the boundary and a dip direction, which can then be sent to the surface of the well by a mud pulse signal and can be stored downhole.

The present invention also preferably includes transducers for providing a micro-depth measurement to indicate the micro-depth that the logging tool has moved in the borehole during an interval. In the preferred embodiment, a plurality of additional depth transducers are axially aligned with one of the imaging transducers. The signals obtained from the depth transducers are correlated with the signals obtained from the imaging transducer, to obtain a micro-depth measurement. This micro-depth measurement preferably is used in conjunction with rotational measurements and with imaging signals obtained by one or more of the imaging transducers to provide a depth/rotational log of borehole and formation parameters.

In the preferred embodiment, the imaging and depth transducers comprise acoustic transducers, operating at a relatively high frequency. Alternatively, electromagnetic sensors could be used for the imaging and/or depth transducers. In yet another alternative embodiment, accelerometers with a high dynamic range may be used as the depth transducers. In the preferred embodiment, the acoustic imaging transducers generate a collimated beam that is directed substantially perpendicularly to the longitudinal axis of the LWD tool. The imaging transducer then receives the acoustic signal reflection from the borehole wall. Supporting electronics are provided with the imaging transducer to produce a time-of-flight signal (i.e., the time between firing and receiving the acoustic beam) for the transducer. Because the properties of the drilling mud are known, and thus the velocity of sound through the mud is known, the standoff distance or borehole wall displacement can be calculated with a relatively high degree of precision. By using three such transducers spaced radially about the LWD tool, a precise determination can be made of borehole geometry.

In the preferred embodiment, the acoustic transducers are fired very frequently to provide a very highly defined image of the borehole. Thus, in an exemplary embodiment, each transducer may be simultaneously fired 200 times per revolution of the LWD tool. The transducers may be fired either based upon time, or based upon position as determined by the downhole directional sensor. The amplitude and time-of-flight of the reflected signals are digitized, encoded, and stored in memory for retrieval later. In addition, these signals may be used by the downhole processor to perform certain desired processing to provide real-time information to the driller via an encoded mud pulse signal.

In the preferred embodiment, the LWD imaging assembly is selectively activated by the driller by providing an encoded mud pulse signal from the surface to the mud pulser in the bottomhole assembly. To conserve memory space, it is expected that the imaging tool will be activated for selected portions of the wellbore. If sufficient memory was provided downhole, then the entire wellbore could be imaged. While the imaging tool can be used during the actual drilling operation, to eliminate the number of spurious signals caused by cuttings and the like, and to provide a more uniform velocity of the logging tool through the borehole, it is preferred that the imaging assembly be activated as the drillstring is being inserted into or removed from the wellbore to change out bottomhole components. Thus, when a desired interval is to be imaged, the drillstring is pulled at a predetermined rate (such as a foot per minute) at a predetermined rotation (such as 120 RPM) while the imaging proceeds.

These and other features of the present invention will become apparent to one skilled in the art by reading the detailed description which follows.

BRIEF DESCRIPTION OF THE DRAWINGS

For a more detailed description of the preferred embodiment of the present invention, reference will now be made to the accompanying drawings, wherein.

During the course of the following description, the terms "above" and "below" are used to denote the relative position of certain components with respect to the direction of flow of the incoming drilling mud. Thus, where a term is described as above another, it is intended to mean that drilling mud flows first through the first component before flowing through the second component. Thus, these and other terms are used to identify the relative position of components in the bottomhole assembly (or BHA), with respect to the distance to the surface of the well, measured along the wellbore path.

DETAILED DESCRIPTION OF THE PREFERRED EMBODIMENT

Figure 10:
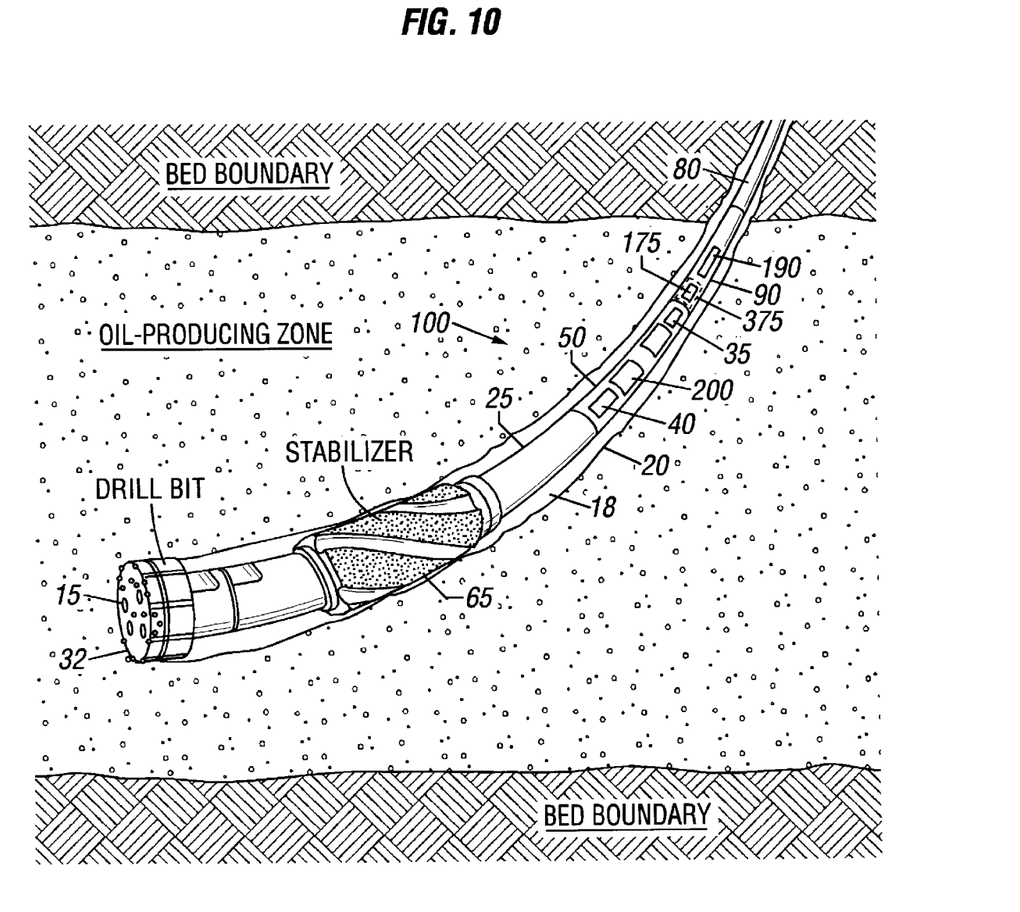
FIG. 10 is a schematic elevation of a drilling assembly implementing an acoustic LWD system in accordance with the present invention.

Referring initially to FIG. 10, a bottomhole drilling assembly 100 is shown for drilling a borehole (or wellbore) 20 through underground formations. In the exemplary embodiment of FIG. 10, the bottomhole assembly (or "BHA") 100 preferably includes a drill bit 32 for drilling the wellbore 20, a near bit stabilizer 65, a downhole motor or turbine 25, an LWD tool 50, a mud pulser collar 90, and a section of drill collar 80 or other conventional downhole components. In accordance with conventional industry practice, the drill collar section 80 connects to a drillstring (not shown), which functions to couple the BHA 100 to the surface equipment. As one skilled in the art will understand, the BHA configuration shown in FIG. 10 may vary substantially from that shown. For example, the downhole motor 25 could be removed from the BHA 100 for certain well segments or intervals. As one skilled in the art will understand, BHA's are configured to optimize the results achieved for a particular well interval of a well plan. The drill bit, stabilizers, mud pulser collar and drill collars preferably comprise components that are known in the drilling industry. Thus, these components will not be described in detail herein, except as they particularly relate to the present invention.

Drilling mud preferably is forced through the interior of the drillstring, and through the interior of the bottomhole drilling assembly 100. The drilling mud exits from the nozzles 15 in the bit 32 and functions to cool and lubricate the bit and to remove earth cuttings and carry the cuttings to the surface along the annulus 18 of the wellbore 20. The drilling mud also serves as a communication medium between telemetry and control units 190 in the mud pulser collar 90 and components at the surface of the well. By altering the flow of the drilling mud through the interior of the drillstring, pressure pulses may be generated, in the form of acoustic signals, in the column of drilling fluid. By selectively varying the pressure pulses through the use of a mud pulser in the mud pulser collar 90, encoded binary pressure pulse signals can be generated to carry information indicative of downhole parameters to the surface for immediate analysis. As one skilled in the art will understand, the drilling mud also may perform a number of other functions, which could include providing operating power to the downhole motor or other components downhole.

The stabilizer 65 preferably includes adjustable blades in accordance with the disclosure in commonly assigned U.S. Pat. Nos. 5,318,137 and 5,318,138, the teachings of which are incorporated by reference as if fully set forth herein. As disclosed in these inventions, the inclination of the bottomhole assembly can be changed by selectively varying the diameter of the stabilizer blades. As one skilled in the art will immediately recognize, the course of the bottomhole assembly 100 also can be changed in accordance with other techniques, such as by selectively turning on or off a downhole motor, adjusting the angle of bend in a bent motor housing, or changing the weight on bit of the system. Use of such an adjustable component downhole in conjunction with an LWD system as disclosed herein makes it possible to design a "Smart System" for drilling certain portions of the wellbore automatically.

While the components in a BHA may change depending upon the portion of the wellbore being drilled, one component that is advantageously used in almost any well interval is the LWD tool 50, which permits parameters to be monitored downhole during the drilling process to optimize drilling. The present invention focuses on a particular type of LWD tool that is capable of obtaining an electronic image of the borehole 20 either during drilling, or during the removal of the BHA 100 from the wellbore. As discussed more fully below, the LWD imaging assembly 200 and associated circuitry disclosed herein also has the capability of determining certain critical parameters such as microdepth measurements and boundary dip angles on a "real-time" basis by transmitting signals indicative of the desired parameter to the surface via a mud pulse signal generated by the mud pulser section 90. While the present invention focuses on an LWD imaging sensor assembly 200, one skilled in the art will understand that other logging sensors may be used in conjunction with the imaging sensors.

Referring still to FIG. 10, the BHA 100 also preferably includes a downhole controller unit 150, which orchestrates the operation of the various downhole sensors. As will be described in more detail below, the downhole controller 150 also provides processing capabilities downhole to permit the sensed data to be processed in a real-time environment, and to permit the processed data to be available during the drilling process. For purposes of illustration, the downhole controller 150 is shown in FIG. 10 in the LWD tool 50. As one skilled in the art will realize, the downhole controller could be located in any convenient location in the BHA 100, such as, for example, the mud pulser collar 90. Similarly, a battery pack or power source 35 is shown in the LWD tool 50. The battery pack 35 may be positioned in any convenient location to provide power to the various electrical assemblies in the BHA.

The LWD tool 50 preferably is located close to the drill bit 32 to facilitate the ability to examine the formation as close to the bit as possible. As one skilled in the art will understand, the LWD tool 50 could also be located further up the bottomhole assembly 100 from the drill bit 32, without departing from the principles of the present invention. Moreover, the LWD tool 50 may in actuality comprise multiple collar sections if necessary to house other LWD sensors.

Figure 1:
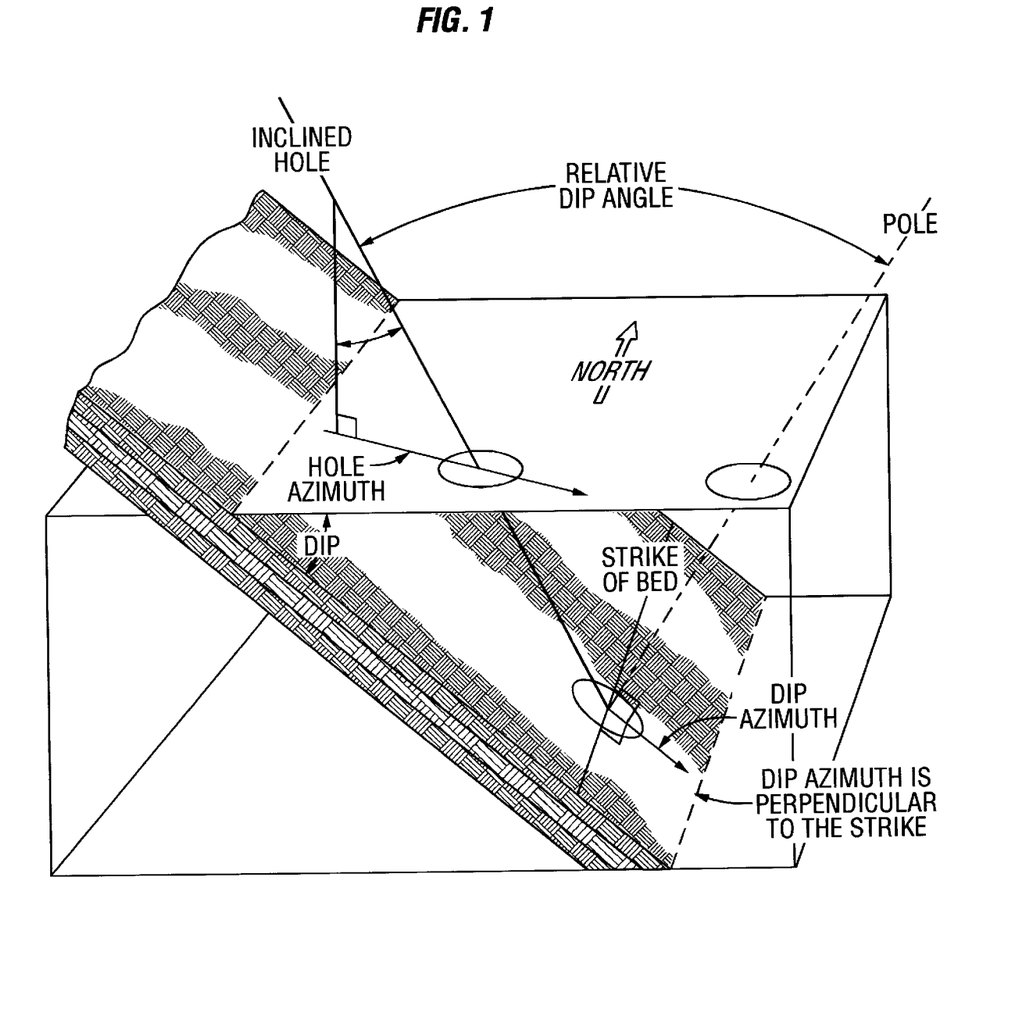
FIG. 1 is an illustration of a wellbore being drilled through a dipping bed formation in accordance with typical drilling practices.

In the preferred embodiment, directional sensors 40 are provided in the logging tool 50, or elsewhere in the bottomhole assembly 100 to provide an indication of inclination angle θ of the BHA 100, the azimuth of the BHA, and the tool face angle. For purposes of illustration, the directional sensors 40 are shown in FIG. 10 in the lower portion of the LWD tool 50. In accordance with known techniques, wellbore directional measurements can be made as follows: a three axis accelerometer measures the earth's gravitational field vector, relative to the tool axis and a point along the circumference of the tool called the tool face scribe line. From this measurement, the inclination of the bottomhole assembly can be determined to provide an indication of the deviation of the wellbore with respect to vertical. The three axis accelerometer also provides a measure of "tool face angle," which is the orientation (rotational about the tool axis) angle between the scribe line and the high side of the wellbore. Additionally, a three axis magnetometer measures the earth's magnetic field vector in a similar manner. From the combined magnetometer and accelerometer data, the azimuth and magnetic tool face angle of the LWD tool may be determined. As one skilled in the art will understand, hole azimuth is the direction of the borehole projected onto the horizontal plane relative to North, as shown in FIG. 1. In many situations, the wellbore is not vertical and the bed boundaries are not horizontal. The wellbore in FIG. 1 is shown with an inclination (or deviation) angle θ measured relative to true vertical. A bed boundary between formations is shown with a dip angle α. The inclined wellbore strikes the dipping bed at an angle β. In addition to providing an image of the wellbore, the present invention also may be used to determine the dip direction (or strike angle) β, which then can be used, together with the inclination angle θ (determined by directional sensor 40), to determine the dip angle α of the bed in true three-dimensional coordinates relative to the horizontal plane and geographical North, according to known techniques.

Figure 2:
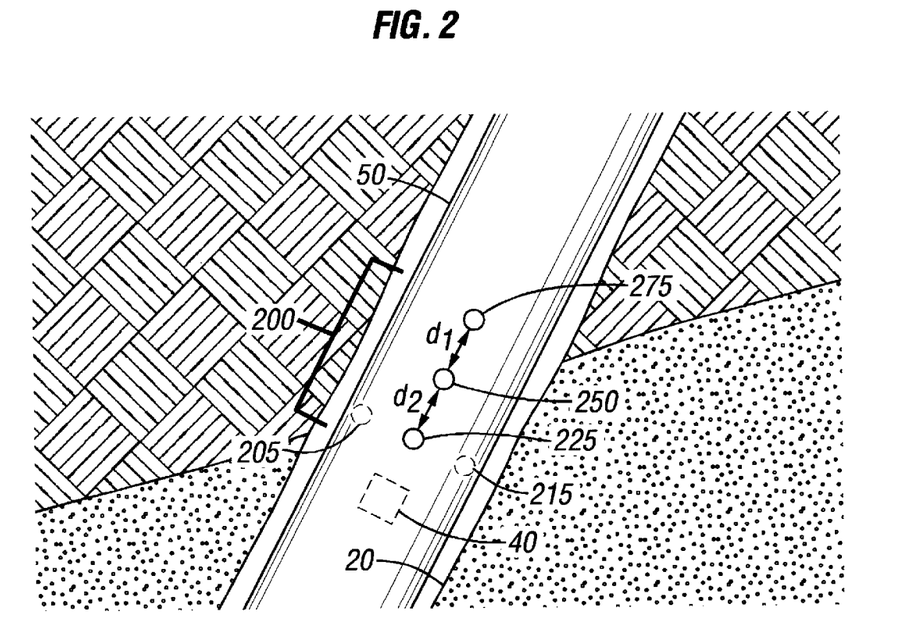
FIG. 2 is a schematic illustration of an LWD imaging tool constructed in accordance with the preferred embodiment.
Figure 3:
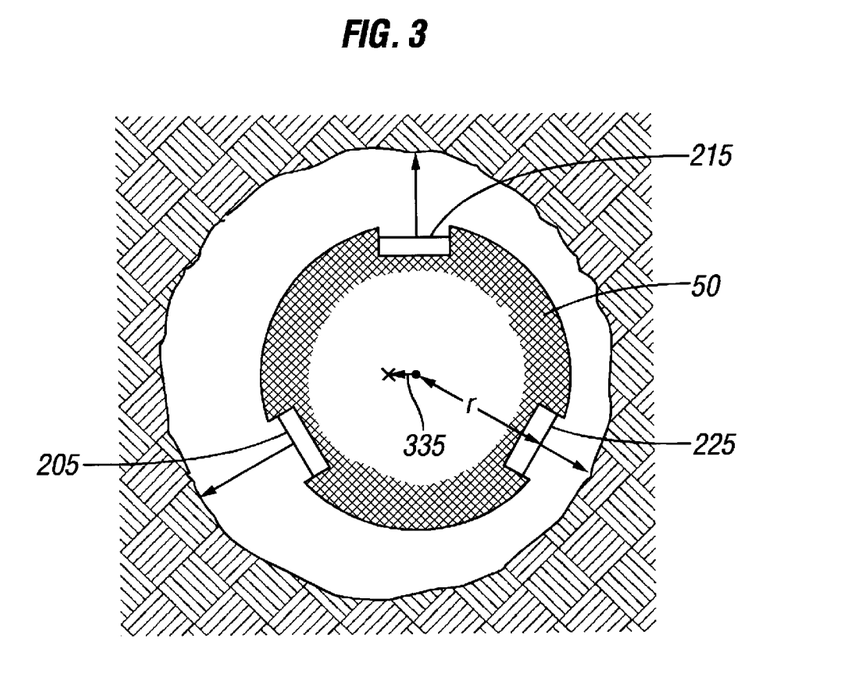
FIG. 3 is a cross-sectional view of the imaging tool of FIG. 2, depicting the spacing of the imaging transducers.

Referring now to FIG. 2, the LWD imaging assembly 200 is shown in more detail in accordance with the preferred embodiment. As shown in FIGS. 2 and 3, the LWD imaging assembly 200 preferably includes a plurality of imaging transducers 205, 215, 225 arranged equidistantly around the circumference of the tool 50, in substantially the same plane transverse to the longitudinal axis of the LWD tool 50. As one skilled in the art will understand, the transducers 205, 215, 225 may be positioned in a staggered arrangement, if desired. Thus, in the preferred embodiment, where three imaging transducers 205, 215, 225 are used, each of the transducers are displaced radially 120° from each of the other imaging transducers. As disclosed in G. L. Moake, et. al. "Standoff and Caliper Measurements While Drilling Using a New Formation-Evaluation Tool with Three Ultrasonic Transducers," Society of Petroleum Engineers (1995) and J. R. Birchak, et al. "Standoff and Caliper Measurements While Drilling Using a New Formation-Evaluation Tool with Three Ultrasonic Transducers," Society of Petroleum Engineers (1993), the use of three transducers to make borehole caliper measurements provides a more accurate representation of borehole geometry than does a single or double transducer assembly. As shown in FIG. 3, the face of transducers 205, 215, 225 are located a distance r from the center of the tool 50.

The imaging transducers 205, 215, 225 preferably are fired simultaneously with a high frequency acoustic signal. Alternatively, an electromagnetic signal could be used to obtain the image. In the preferred embodiment, the acoustic frequency is in the range of 100 kHz–350 kHz, with a signal of 250 kHz deemed optimal. The received signals are conditioned to remove noise, and then are processed to determine a distance to the borehole wall based upon the time-of-flight of the acoustic signal. In addition, the reflected acoustic waveform is stored and/or processed to obtain additional information regarding the properties of the formation, such as the acoustic impedance of the formation, the presence of a bed boundary, the dip angle α and/or strike angle β of the boundary, the presence of voids or vugs in the borehole wall, and the like. The caliper measurement provided by the imaging transducers 205, 215, 225 may also be used to electronically re-position a reference point for the logging tool 50 in the center of the borehole (defined as x), as shown by arrow 335 in FIG. 3. The signals obtained by the imaging transducers and other LWD sensors then can be processed by a suitable algorithm to obtain a model for the properly centered logging tool.

In the preferred embodiment, the transducers are fired 200 times for each revolution of the tool. If the tool is rotated at 120 rpm, the transducers 205, 215, 225 are fired every 2.5 milliseconds. Alternatively, the transducers can be fired based upon the relative rotational bearing that is measured by directional sensor 40. In this embodiment, the transducers would be fired each time the tool rotates 1.8° to obtain the 200 firings per revolution.

Referring still to FIG. 2, the LWD imaging assembly 200 also preferably includes a plurality of transducers 250, 275 aligned axially with one of the imaging transducers. In FIG. 2, transducers 250, 275 are shown aligned axially with imaging transducer 225. The transducers 225, 250, 275 provide an indication of micro-depth through a correlation process. As shown in FIG. 2, the transducer 275 is axially displaced from transducer 250 by a distance defined as $d_1$. Similarly, transducer 250 is axially displaced from transducer 225 by a distance defined by $d_2$. In accordance with the preferred embodiment, and as explained in more detail below, the borehole image obtained from transducer 225 is compared with the images obtained by transducers 250, 275 (which preferably are fired at the same rate as transducer 225). When the borehole image obtained from transducer 225 correlates to an image obtained by transducer 250, then the LWD tool is assumed to have moved a depth equal to $d_1$ within the borehole. The images obtained from transducer 275 can similarly be correlated to the images from transducers 225 and 250 to validate and enhance the micro-depth measurement.

Figure 5:
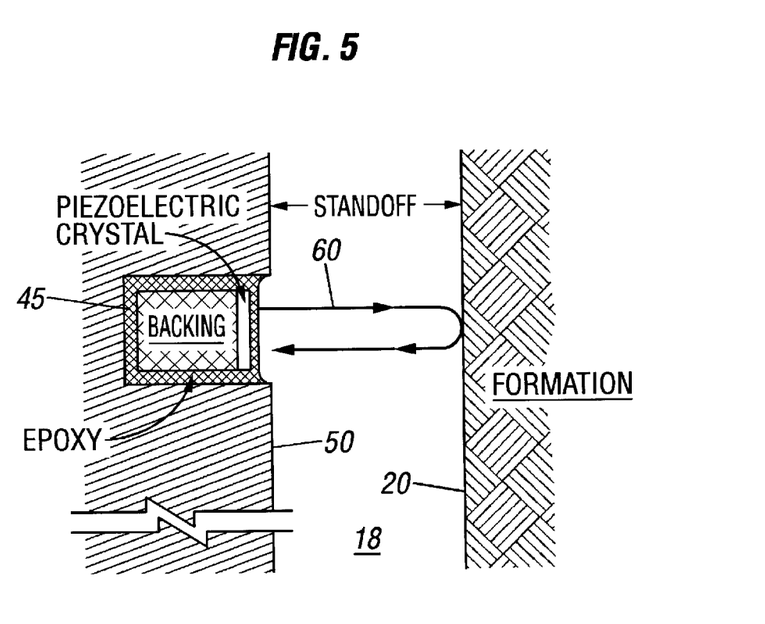
FIG. 5 is a more detailed illustration of the preferred embodiment of FIG. 2, depicting one of the acoustic transducers and the manner in which acoustic signals are reflected off the borehole wall.

If an acoustic sensor is used as the transducer, it is preferred that the acoustic sensor be configured and operate as generally described in commonly assigned U.S. application Ser. No. 08/219,062, filed Mar. 29, 1994, U.S. Pat. No. 5,486,695 the teachings of which are incorporated herein. Thus, as shown in FIG. 5, a piezoelectric crystal is mounted in a recess 45 in logging tool 50. The crystal preferably has a tungsten alloy backing surface to dampen the crystal and prevent ringing. The crystal and backing are secured in recess 45 with a suitable epoxy. As shown in FIG. 5, the crystal is recessed a minimum distance from the exterior of the tool to prevent excessive wear, especially as the outer surface of the tool 50 is worn. In operation, the piezoelectric crystal preferably generates ultrasonic signals 60 in response to an electrical pulse from a voltage source, such as a battery (not shown) in the preferred embodiment. This signal 60 travels through the drilling fluid surrounding the tool 50 and is reflected by the borehole wall 20. At least a portion of the ultrasonic signal 60 rebounds from the borehole wall 20 and is received by the piezoelectric crystal, which in turn converts the signal received into an electrical pulse. The arrival time of the reflected signal thus received is recorded and a "time-of-flight" signal is generated by electronic circuitry, as described more fully below. The time-of-flight signal preferably is used to determine the standoff distance between the transducer and the borehole wall 20. In addition, the amplitude of the reflected signal also is analyzed for formational characteristics.

The acoustic impedance of the epoxy layer preferably is selected to optimize the transfer of acoustic energy into the mud. Also, the impedance of the backing preferably is selected to match the impedance of the crystal, and functions to absorb the portion of the wave emitted from the back of the crystal. The backing also dampens the ringing that would otherwise persist in the crystal after transmission of the acoustic signal. To function properly, the damping must occur before the reflected waves are received by the crystal.

If, instead of using an acoustic transducer, an electromagnetic transducer is used, it is desired that the transducer be configured and operate as generally described in U.S. Pat. No. 5,045,795, the teachings of which are incorporated by reference herein. Alternatively, an electrically steered, orthogonal triad transducer may be used as disclosed in commonly assigned U.S. application Ser. No. 08/353,003, filed Dec. 9, 1994, now allowed the teachings of which are incorporated herein. The electromagnetic transducer preferably comprises electrodes or coils which are configured according to known techniques to micro spherically focus survey current into the formation to provide very fine vertical resolution. Micro spherically focused logs (MSFL's) currently are used in wireline resistivity logging devices. See Open Hole Services, pages 12–13 (Halliburton Logging Services 1992). The electromagnetic transducers preferably have an operating frequency of approximately 15 kHz.

Figure 4:
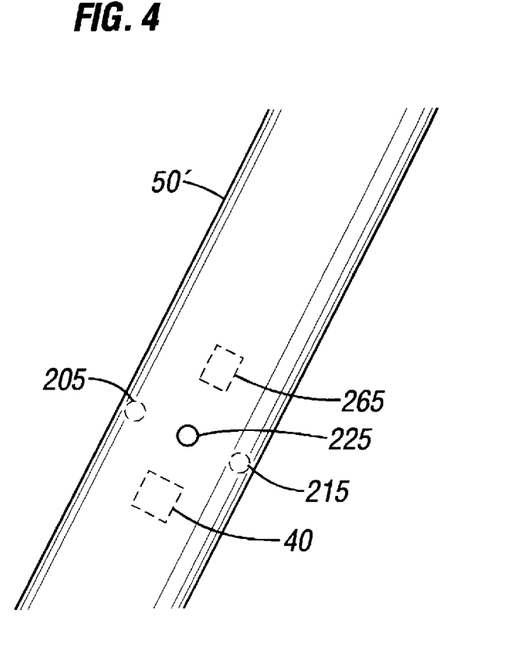
FIG. 4 is an alternative embodiment to FIG. 2, in which an accelerometer is used to provide micro-depth measurements.

As an alternative to the transducer arrangement shown in FIG. 2, and referring now to FIG. 4, the depth transducers 250, 275 of FIG. 2 can be replaced with a z-axis accelerometer 265 mounted axially on logging tool 50'. Because of the high acceleration forces present downhole during drilling, the accelerometer 265 must have a very large dynamic range (in excess of 500 g's) to prevent saturation. The measured acceleration forces a in the z direction (that is, along the longitudinal axis of the tool 50') detected by the accelerometer 265 is double integrated with respect to time t to obtain a micro-depth measurement d, as follows:

$$d = \int \int_0^\tau a \, dt \qquad (1)$$

Figure 6:
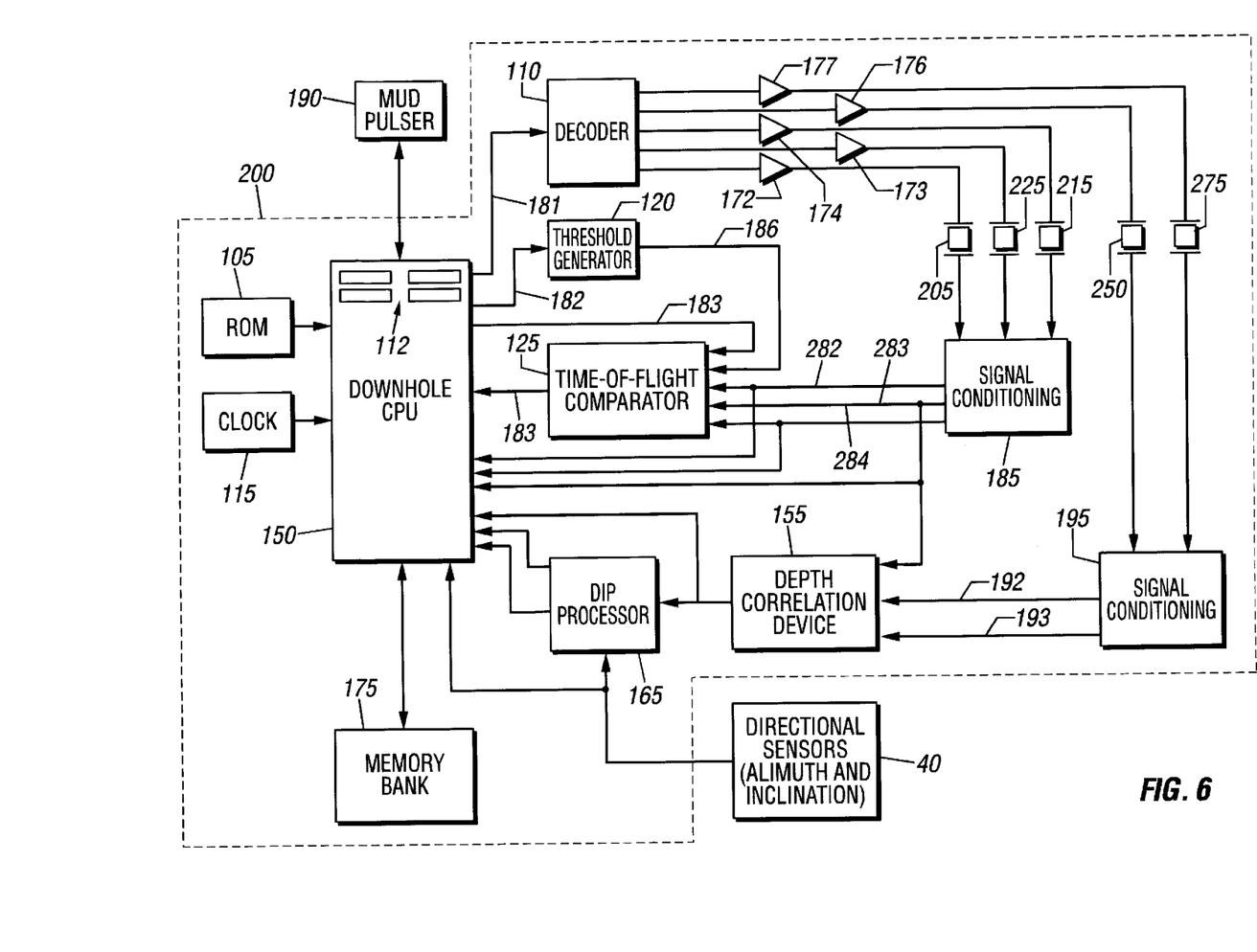
FIG. 6 is a block diagram of the electrical system layout of the preferred embodiment of FIG. 2.

Referring now to FIG. 6, an exemplary block diagram is shown of the electronic circuitry for the LWD imaging assembly 200 constructed according to the embodiment of FIG. 2. Although not shown in FIG. 10, the electronic circuitry preferably is mounted within a pressure barrel to prevent contamination, and connects to the transducers 205, 215, 225, 250, 275, through a conductor bundle. The electronic circuitry preferably is powered by the battery pack 35, to which it is connected by suitable conductors.

Referring still to FIG. 6, the LWD imaging assembly 200 preferably comprises a downhole processing unit 150 (referred to herein as "CPU," "processing unit" or "processor"), a transducer decoder 110 for generating firing pulses for the transducers, a threshold generator 120, a time-of-flight comparator 125, a depth correlation device 155 to correlate the images from the depth transducers, a dip processor 165, a clock 115, and a memory bank 175 for storing image, micro-depth and other signals. As one skilled in the art will realize, the dip processor 165 may be omitted from the imaging assembly 200 if a dip angle determination is not required, or if the dip angle is to be calculated at the surface of the well.

The downhole processing unit 150 preferably is programmed in accordance with conventional techniques to generate a predetermined number of measurements per revolution of standoff distance for each imaging transducer 205, 215, 225. In the preferred embodiment, 200 measurements are taken for each revolution of tool 50. As one skilled in the art will understand, however, the measurements can be taken more or less frequently as desired. The CPU 150 initiates transducer firing based upon either the relative rotational bearing, as determined by directional sensors 40, or based upon an expired time period determined by the number of clock pulses received by the CPU 150 from downhole clock 115. The image data obtained from the a transducers can then be stamped (with current time, depth, or relative rotational bearing, as desired) to supplement the known firing pattern to provide information relating to both time and direction.

Thus, for example, if the transducers are fired based upon the relative rotational bearing, then the angle between firings is predetermined, and a time stamp is stored with the reflected image signals. In addition, a periodic flag may be provided with certain signals to provide a point of reference. Thus, for example, the firing that occurs when the relative rotational bearing is North may have a flag bit associated with that signal as a directional reference. The relative rotational bearing of firing of each other stored signal then can be determined by adding the predetermined firing angle (i.e., 1.8° for 200 firings per revolution) to the flag direction. Consequently, the memory location at 100 firings after the North flag will be in a South direction (100×1.8°=180°).

Conversely, if the transducers are fired based upon a predetermined time interval (i.e., every 2.5 milliseconds if a rotation rate of 120 rpm is used for the tool, and 200 firings per revolution is the desired sampling rate), then the reflected image signals are stamped with a directional value from the directional sensor 40, together with a time stamp at the start (and end) of image gathering to use as a time reference point for all other values.

To initiate firing of the transducers 205, 215, 225, (and assuming that each transducer is fired simultaneously) the processor 150 generates timing signals that are transmitted to the transducer decoder 110, the threshold generator 120 and the comparator 125. Timing signals also may be provided to the dip processor 165, and are required in the absence of a micro-depth measurement. Upon receipt of the first timing signal from the central processing unit 200 on conductor 181, the transducer decoder 110 initiates voltage pulses that are amplified by amplifiers 172, 173, 174, 176, 177 and transmitted to the transducers 205, 215, 225, 250, 275 causing each to fire. The transducer decoder 110 determines the magnitude and the width of the voltage pulses sent to the transducers. The voltage pulse causes the transducers to fire an acoustic wave that is transmitted radially from the logging tool 50. Acoustic signal reflections caused by the borehole wall are received by the firing transducer, which then generates an electrical output signal that is amplified and filtered by signal conditioning circuitry 185, 195. The conditioned output signals from the imaging transducers 205, 215, 225 are applied on conductors 282, 283, 284 to the comparator 125 and to the CPU 150. The image signal from the imaging and depth transducer 225 also is provided to the dip processor 165 and to the depth correlation device 155. The conditioned output signals from the other depth transducers 250, 275 also are applied on conductors 192, 193 to the depth correlation device 155.

The second timing signal from the CPU 150 is transmitted on line 182 to the threshold generator 120. The second timing signal is used by the threshold generator 120 to determine the length of the wait period between the firing of the imaging transducers 205, 215, 225 and the time at which reflected pulses can be accepted. The wait period is required to prevent false signals that would otherwise result from the ringing of the crystal.

Figure 7:
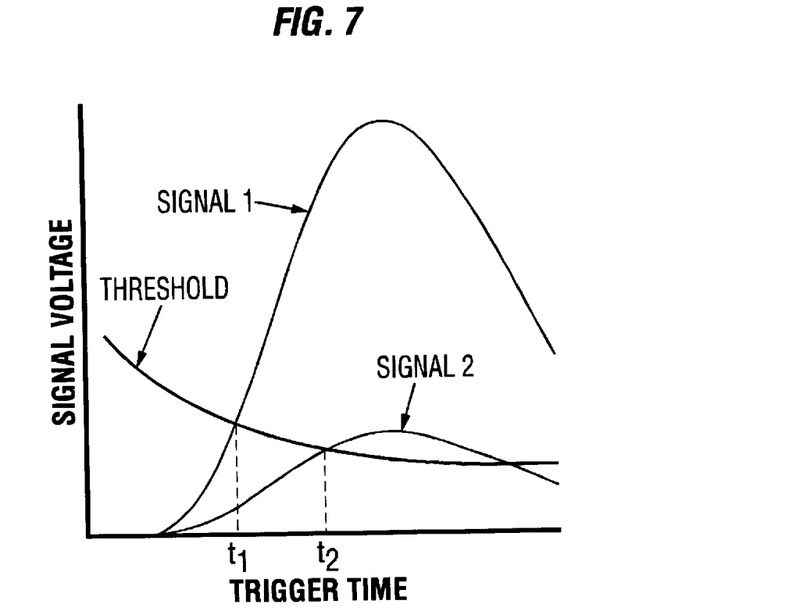
FIG. 7 is a graph illustrating the variation in the threshold triggering voltage with time, for the threshold generator of FIG. 6.

The third timing pulse is transmitted via conductor 183 to the time-of-flight comparator 125 and is used to start the time-of-flight measurement and limit the output range of the comparator. After the wait period has expired, the amplitude of the reflected pulses are compared in the comparator 125 with an electronic threshold established by the threshold generator 120 on conductor 186. Because the amplitude of the ultrasonic waves decrease with the distance travelled, and thus the time travelled, the threshold preferably decays exponentially with time, as shown for example in FIG. 7. This decaying of the threshold value provides the same sensitivity to all waves, regardless of the distance that the wave has travelled. If the received signal is greater than the threshold value, the comparator 125 calculates a time-of-flight value by counting the period between the time that a signal is received on line 183 from the processing unit 150, and the time that a signal is received from the transducer on line 282, 283 or 284. An electrical signal indicative of the time-of-flight value preferably is transmitted to the central processing unit 150 on bus 188, and is used by the CPU 150 to determine standoff distance for each of the imaging transducers.

The distance R from the center of the imaging tool to the borehole wall 20 may be determined by the processor 150 according to the following formula:

$$R = \frac{v(t - t_0)}{2} + r \quad (2)$$

where r is the distance from the center of the tool to the face of the transducer;

v is the speed of sound (or acoustic velocity) in the drilling fluid;

t is the time-of-flight measured for the acoustic wave; and $t_o$ is the offset time reflecting the electronic delays of the circuitry and the time required for the acoustic wave to travel through the encapsulating epoxy.

The acoustic velocity v in the drilling fluid under actual conditions downhole can be measured dynamically according to certain known techniques. In the preferred embodiment, however, a value is assigned to the acoustic velocity v based on the borehole conditions, including the type of drilling fluid (water-based or oil-based), fluid weight, fluid salinity, temperature and pressure, all of which are known during a drilling operation. The manner of estimating the speed of sound in the drilling fluid can be accomplished by assembling equations for the known parameters to provide a reasonably accurate approximation. See generally M. Greenspan, et al. "Tables of the Speed of Sound in Water," *J. Acoust. Soc. Am.*, Vol. 31, No. 1 (Jan. 1959); C. C. Leroy, "Development of Simple Equations for Accurate and More Realistic Calculation of the Speed of Sound in Sea Water," *J. Acoust. Soc. Am.*, Vol. 46 (1969); A. L. Podio, et al. "Ultrasonic Velocity and Attenuation Measurements in Water-Based Drilling Muds," ASME Drilling Technology Symposium, PD Vol. 27 (Jan. 14–18, 1990). An approximation of a value for the acoustic velocity v based on these parameters is sufficiently precise for the purposes of the present invention. The offset time $t_o$ is determined in a tool calibration procedure conducted in accordance with conventional techniques prior to the use of the logging tool 50.

The standoff distance S(t) preferably is measured once for each sampling interval t, which preferably is at least every 2.5 milliseconds, so that a measurement is made 400 times a second for a tool rotation rate of 2 revolutions per second (which equates to 120 RPM). Thus, if the logging tool 50 is rotating at 120 RPM and measurements are taken every 2.5 millisecond, 200 measurements are made of the standoff distance for each imaging transducer in one rotation of the logging tool.

The conditioned signals from transducers 205, 215, 225 also are preferably provided to the downhole CPU 150, where the amplitude, phase, and other characteristics of the signals can be stored and/or analyzed. In the preferred embodiment, the signals are analyzed by the processor 150 to determine the amplitude of the reflected signal. The processor then encodes the measured amplitude into a digital signal for storage in memory 175, together with an appropriate time or direction stamp, as discussed above. In addition, the conditioned signals from one or more of the imaging transducers preferably is provided as an input to the dip processor 165. In the exemplary embodiment of FIG. 6, the conditioned output of transducer 225 is provided as an input to the dip processor; however, any or all of the conditioned output signals may be analyzed for dip information.

The memory array 175 preferably is provided in the LWD imaging assembly for storing image signals including time-of-flight values and amplitude of the reflected signals. The memory unit 175 stores measured and processed data for retrieval subsequently. As shown in FIG. 10, the memory array preferably is stored in a convenient location to permit quick access to the array when the logging tool is removed from the wellbore to minimize rig time. In FIG. 10, the memory array 175 is shown in the lower end of the mud pulser collar 90, but it should be understood that the array 175 may be positioned in any convenient location in the bottomhole assembly 100. As shown in FIG. 10, the memory array is housed beneath a removable cover 375 to provide immediate access to the memory. Preferably, the memory array 175 is replaceable, so that it can be quickly removed, and another array substituted. Alternatively, an external plug or connector may be provided to allow for a high speed data dump of the memory contents at the well surface.

The downhole memory device 175 preferably comprises an array of flash memory units. In the preferred embodiment, the downhole memory bank has a total storage capacity of 50–80 Mbytes or more. More or less memory may be provided as required for the particular application. It is expected that each 500 foot interval will require at least 50 Mbytes of storage space in memory. In the preferred embodiment, the dip processor 165 and microcontroller 150 provide real-time analysis of the received acoustic wave to permit real-time decisions regarding the drilling operation. The entire digitized waveform, however, is stored in the downhole memory 175 for subsequent retrieval when the bottomhole drilling assembly is pulled from the well. Data is written to the memory 175 through a gate array controller (not shown) in accordance with conventional techniques.

In addition to the memory array 175, a read only memory 105 ("ROM") preferably also is included in the LWD imaging assembly 200 for storing certain basic input operating instructions for the CPU 150 in accordance with conventional techniques. The ROM 105 may also be used in an alternative embodiment to store weight function values in a look-up table. Status and control registers 112 also preferably are provided in accordance with conventional techniques to store control and status information for the CPU 150.

In the preferred embodiment of the present invention the depth correlation device 155 is provided to obtain micro-depth measurements downhole. As one skilled in the art will realize, macro measurements of depth are obtained at the surface of the well, based upon the amount of tubing run in the well. The macro measurements of depth then are correlated with a time clock. A clock, such as clock 115, is provided downhole which is synchronized with the surface clock. Log measurements made downhole are time stamped with the downhole clock. Subsequently, when the logging tool is removed from the wellbore, the measured values are correlated back to the macro depth measurement using the synchronized clocks. While this technique also can be applied to the images obtained with the present invention, resolution of the image can be enhanced by also implementing a device capable of micro-depth measurements downhole.

To that end, and according to the preferred embodiment, depth transducers 225, 250, 275 are provided as part of the imaging logging assembly 200. The depth correlation device 155 receives the images from the depth transducers and runs a correlation routine, comparing the images from the depth transducers 225, 250, 275. Such a correlation can be implemented on a digital signal processor using known correlation techniques. When the images obtained from any two depth transducers correlate, a micro-depth measurement can be obtained in a straightforward manner because the distance between the transducers 225, 250, 275 is known, as shown in FIG. 2. Preferably, the depth correlation device 155 operates continuously to provide a micro-depth measurement whenever the logging tool 50 is rotated. In addition to storing the micro-depth measurements in memory with a time stamp, in the preferred embodiment the micro-depth measurement is encoded by the processor 150 and transmitted periodically to the surface for a real-time micro-depth measurement.

The micro-depth measurement also preferably is used in conjunction with rotational readings to obtain image logs in the dip processor 165. The dip processor 165 may comprise a digital signal processor. Optimally, both the functions of the dip processor 165 and the depth correlation device 155 are performed in a single digital signal processor.

Typically, image logs are obtained with rotational values as the abscissa, and time values as the ordinate. Because drilling penetration rates vary greatly with time, the log obtained using time tends to be "smeared". The ability to use micro-depth measurements enhances the resolution of the image log, and also makes it possible to determine boundary dip angles on a real-time basis. Alternatively, if accelerometers are used as discussed above with respect to FIG. 4, the depth correlation device 155 obtains a micro-depth measurement by performing a double integral on the accelerometer value with respect to the time measured from clock signals initiated by clock 115.

Figure 8:
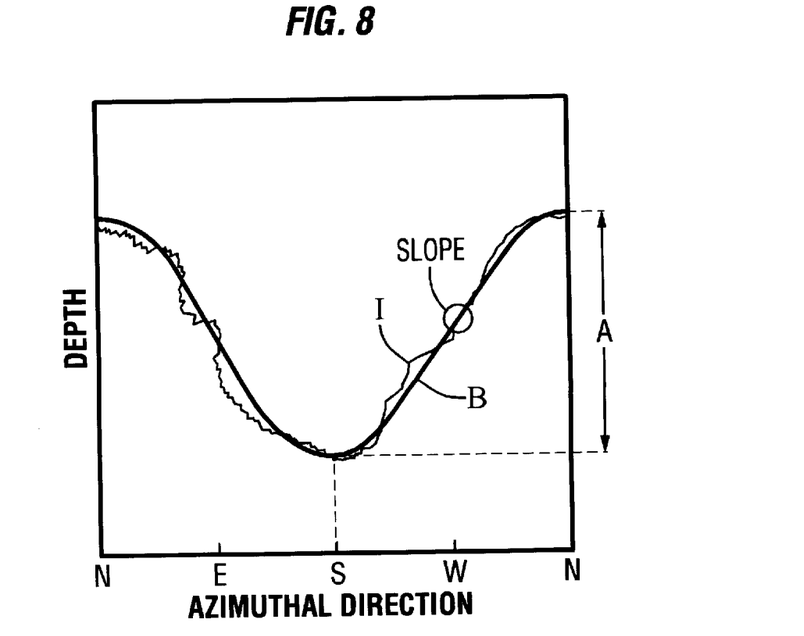
FIG. 8 depicts an example of a rotational log which might be generated by the invention of FIG. 2, showing a bed boundary crossing the wellbore.

In the preferred embodiment, the micro-depth measurement is provided as an input to the dip processor 165, together with directional values from the directional sensors 40. These values are used to electronically plot an image from acoustic signal reflections received by one of the imaging transducers. An example of a log that might be obtained from an imaging transducer when a boundary crosses the borehole is shown for purposes of illustration as signal I in FIG. 8. As shown in FIG. 8, the abscissa comprises the relative rotational bearing, represented as N (North), E (East), S (South), and W (West). The ordinate comprises the depth values obtained from depth correlation device 155.

Referring still to FIG. 8, to obtain measurements regarding the boundary direction, boundary dip angle $\alpha$, or other desired parameters, a best fit sine wave B is applied to the image signal I in the image log, according to the preferred embodiment. A sine wave is used because of the realization that a plane intersecting a cylinder produces a sine wave shaped path on the surface of the cylinder, if the cylinder is unwrapped. Once the sine wave B is obtained, the amplitude A of the sine wave, and the slope of the sine wave taken at an amplitude midpoint of the sine wave, can be obtained to determine the strike angle $\beta$ between the borehole and bed boundary. The dip angle $\alpha$ can then be obtained by subtracting out the borehole inclination angle $\theta$ (obtained from the directional sensor 40) from the strike angle $\beta$. The direction of the dip also can be obtained by determining the low point of the sine wave, which as shown in the example of FIG. 8 is South. Once the dip angle $\alpha$ and dip direction are determined, they can be transmitted to the processor 150, encoded, and transmitted to the surface for real-time analysis by the driller, as can any other desired dip information.

In the preferred embodiment, the dip processor 165 periodically checks for the presence of a bed boundary intersecting the borehole. The presence of a boundary can be determined by performing a peak correlation routine with the image signals. Edge enhancement is performed on the image to improve the detection of the lithologic bed boundaries. Potential bed boundaries are delineated through the detection of sinusoidal features which traverse the image azimuthally. These features are detected by using cross-correlation techniques applied along sinusoidal paths which preferentially find the maximum correlatability when directly following a sinusoidal feature in the image. A peak or multiple peaks are found in a map of correlations of all possible sinusoid amplitudes and phases. If a boundary is detected, then the dip processor 165 proceeds with calculating bed direction and dip angle $\alpha$. If, conversely, no bed boundary is found, the processor 165 may perform other processing, such as the depth correlation performed by correlation device 155.

Referring still to FIG. 6, the mud pulser unit 190 permits acoustic mud pulse signals to be transmitted through the column of drilling mud to the surface controller during the drilling of the wellbore. The mud pulser unit 190 preferably includes an associated controller (not shown) for receiving signals from the processor 150 and actuating the mud pulser 190 in response. In addition, in the preferred embodiment, the mud pulser includes a transducer for detecting mud pulses from the surface controller. The output of the transducer preferably produces an output signal to the microprocessor 150 through appropriate circuitry (not shown) that is known in the art.

As noted, the transducers preferably comprise acoustic transducers for generating and detecting acoustic signals. While a piezoelectric element is used in the preferred embodiment, the transducers also could be constructed of magnetostrictive rods (see U.S. Pat. No. 4,869,349) or barium titanate (see U.S. Pat. No. 3,593,255) in accordance with known techniques. In the preferred embodiment, the transducers operate linearly.

Figure 9:
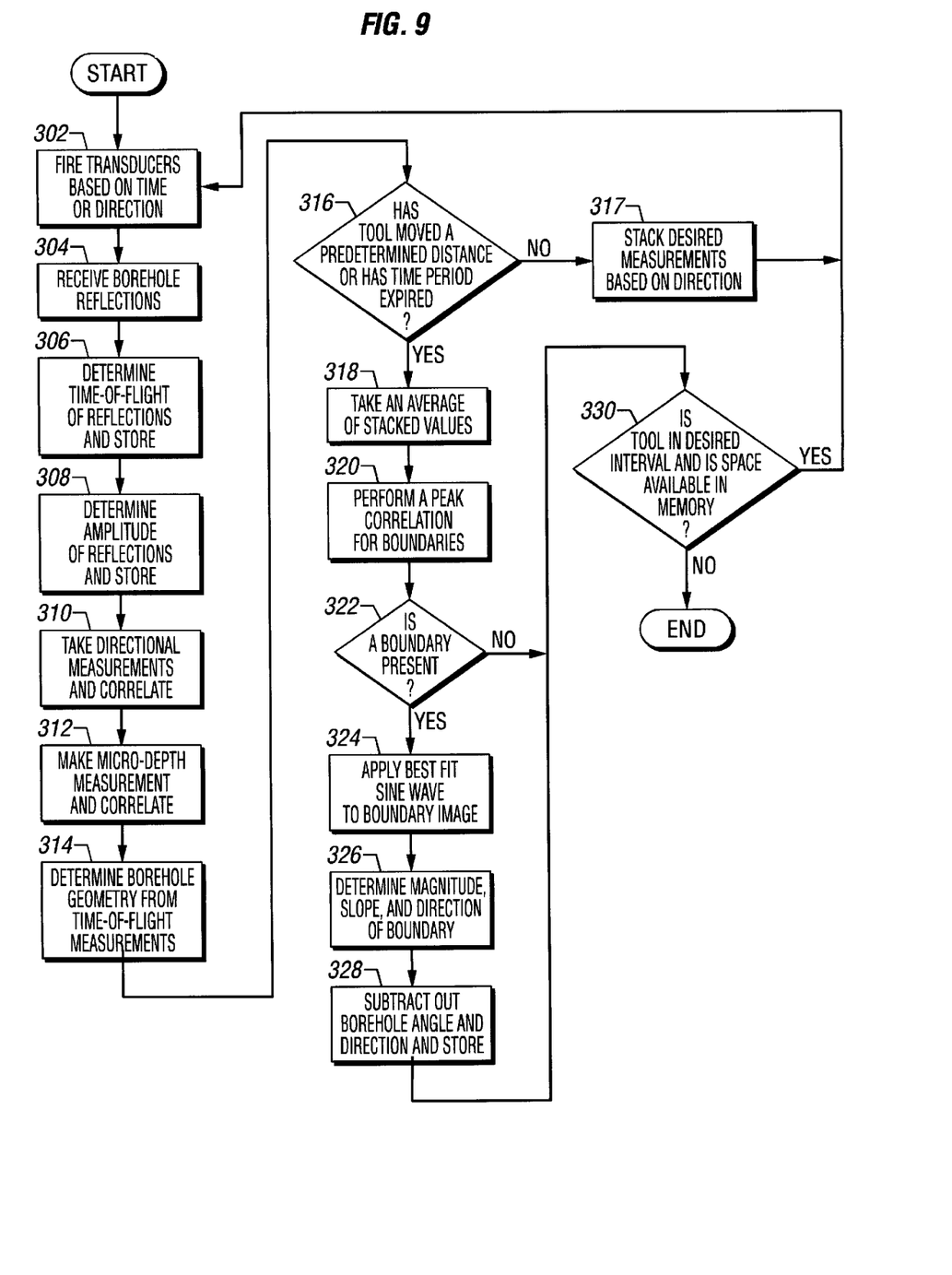
FIG. 9 is an exemplary flow chart depicting the operation of the imaging system of the present invention.

Referring now to FIG. 9, the operation of the LWD imaging assembly will now be described. When a command is received from the surface to begin imaging, or if a particular predetermined interval is encountered during drilling, the imaging assembly begins operation. In response, the microprocessor in step 302 fires the imaging transducer(s), and depth transducers (if provided) in step 302. The transducers can be fired based upon either a particular relative rotational bearing, or based upon a particular time interval. Preferably, the sensors are fired simultaneously, and with the same sampling rate, to minimize subsequent processing. Shortly thereafter, reflections are received from the borehole wall, as indicated in step 304. If acoustic signals are used, the signal has a velocity in drilling mud on the order of 180–195 microseconds per foot. Thus, even with an extremely large standoff of six inches, reflections will arrive back at the transducer within 200 microseconds, which is much less than the desired firing rate of 2.5 milliseconds (or 2500 microseconds). As discussed with reference to FIGS. 5 and 6, early arriving signals caused by ringing of the transducer are rejected.

In step 306 the microprocessor determines the time-of-flight of the imaging transducer(s), and stores either the time-of-flight, or the associated standoff distance, in the memory array. The microprocessor also obtains an amplitude value from the reflected signals in step 308, and stores an encoded value for the amplitude in memory. In step 310, the microprocessor causes a directional measurement to be taken. The directional measurement can be used to directionally stamp or flag the stored distance and amplitude values, if desired. In step 312, a depth measurement is made to obtain a micro-depth indication. As discussed above, the micro-depth measurement can be made either by correlating images from depth transducers, or from an accelerometer. The micro-depth measurement obtained is stored and correlated with the measured standoff and amplitude values. In step 314, the processor may determine the borehole geometry if desired. The borehole geometry can be used by the processor to electronically re-center the logging tool in the borehole to correct log measurements.

After the basic imaging measurements have been obtained, the processor in step 316 determines whether the LWD tool has moved a predetermined depth in the borehole, or if a predetermined time has elapsed. A suitable depth distance may be on the order of 1/3", which equates to the vertical resolution of acoustic transducers. If the tool has not moved the predetermined depth, or if the predetermined time period has not elapsed, the processor continues to loop through steps 302 through 314, by firing the transducers (based upon time or radial direction) and obtaining and processing reflected signals. At step 317, multiple measurements from the same azimuthal and depth positions are averaged until the tool moves depth wise.

If the processor determines that the LWD tool has moved within the borehole the predetermined distance, the processor proceeds to step 318, and stacks the image signals gathered during that interval based upon direction. Thus, for example, each of the amplitude values obtained in a particular relative rotational bearing during the drilling (or removal of the tool from the wellbore) of 1/3" are stacked together to obtain an average value for that rotational bearing. If there are 200 firing points in one revolution of the tool, then 200 stacked amplitude values are obtained for the 1/3" segment. This stacking of image signals minimizes the memory space required for image signals.

The dip processor performs a peak correlation in step 320 to determine if any bed boundaries are present. If a boundary is present (step 322), a best fit sine wave is applied to the image signal in step 324, and the amplitude, slope and direction of the dip with respect to the borehole are calculated in step 326. The borehole inclination angle $\theta$ is subtracted out and the resulting dip angle $\alpha$ is stored in memory together with the dip direction in step 328. In addition, the dip angle $\alpha$ and direction may be transmitted by mud pulse to the surface.

Subsequently, or if no boundary is detected in step 322, the processor determines whether the tool is still in the desired interval and whether sufficient memory space is still available (step 330). If the answer to either question is no, the imaging assembly terminates operation. Conversely, if space is available in memory and if imaging is still desired, the processor loops back to step 302 and continues operation.

While certain exemplary embodiments of the present invention have been shown and described, modifications thereof can be made by one skilled in the art without departing from the spirit of the invention.

We claim:

1. An acoustic imaging assembly for use with a bottomhole drilling assembly to obtain an image of the borehole, comprising:

an imaging transducer for generating a plurality of acoustic signals that are fired radially with respect to the bottomhole assembly, said transducer also receiving acoustic reflections of said plurality of acoustic signals from the borehole wall and producing electrical signals in response;

a downhole processor coupled to said imaging transducer, said processor generating a signal causing said transducer to fire, and said processor receiving the electrical signals from said transducer indicative of the acoustic signal reflections, said processor analyzing said electrical signals to obtain for each acoustic signal a first signal indicative of the distance between the transducer and the borehole wall and a second signal indicative of the amplitude of the acoustic signal reflection;

a memory array electrically coupled to said downhole processor, said downhole processor storing said first signal and said second signal in said memory array each time the transducer is fired and a reflection is received;

a downhole clock electrically coupled to said downhole processor for providing a clock signal to said processor;

a directional sensor for generating directional signals that are transmitted to said processor; and wherein said processor correlates for each of said plurality of acoustic signals said first signal indicative of distance and said second signal representing the amplitude of the acoustic reflection with the relative rotational bearing of the transducer and the time at which the reflections are received by the transducer.

2. An assembly as in claim 1, wherein said downhole processor stacks said second signals based upon direction and stores only a single stacked value for each direction in a given predetermined interval.

3. An assembly as in claim 1, wherein said acoustic signal has a frequency between 100 kHz–350 kHz.

4. An assembly as in claim 1, wherein said bottomhole assembly includes a mud pulser, and said downhole processor electrically couples to said mud pulser for receiving surface commands, and for transmitting downhole formational data to the surface.

5. An assembly as in claim 4, wherein said first signal indicative of the distance between the transducer and the borehole wall represents the time-of-flight of the acoustic signal and the acoustic signal reflection.

6. An assembly as in claim 4, wherein said surface command directs said downhole processor to begin imaging.

7. An assembly as in claim 6, wherein said surface command initiating imaging is transmitted during selected intervals as the bottomhole hole assembly is pulled from the borehole.

8. An assembly as in claim 6, wherein said surface command initiating imaging is transmitted during selected intervals as the bottomhole assembly drills the wellbore.

9. An assembly as in claim 1, further comprising a depth transducer axially displaced from said imaging transducer a distance d, said depth transducer also generating an acoustic signal and receiving acoustic reflections from the borehole wall.

10. An assembly as in claim 9, wherein said depth transducer produces an electrical signal indicative of the amplitude of the acoustic reflection.

11. An assembly as in claim 10, further comprising a depth comparator for comparing the electrical signals obtained from said imaging transducer with the electrical signal obtained from said depth transducer, and obtaining a micro-depth measurement of d when a correlation is found.

12. An assembly as in claim 11, wherein said downhole processor monitors said electrical signals obtained from said imaging transducer and prepares a log based upon the relative rotational bearing and depth.

13. An assembly as in claim 12, wherein said downhole processor obtains a dip angle α and a dip direction from said log.

14. An assembly as in claim 13, wherein said downhole processor includes a microprocessor and a digital signal processor.

15. An electromagnetic imaging assembly for use with a bottomhole drilling assembly to obtain an image of the borehole, comprising:

an imaging transducer for generating multiple electromagnetic signals that are focused radially with respect to the bottomhole assembly, said transducer also receiving induced current from the borehole caused by each of said electromagnetic signals and producing for each of said multiple electromagnetic signals an electrical signal indicative of a restivity value in response;

a downhole processor coupled to said imaging transducer, said processor generating a signal causing said transducer to generate each of said multiple electromagnetic signals, and said processor receiving the electrical signals from said transducer indicative of each resistivity value;

a memory array electrically coupled to said downhole processor, said downhole processor storing said each resistivity value;

a downhole clock electrically coupled to said downhole processor for providing a clock signal to said processor;

a directional sensor for generating directional signals that are transmitted to said processor;

a depth transducer axially displaced from said imaging transducer a distance d, said depth transducer also generating an electromagnetic signal and receiving induced current from the borehole wall; and wherein said processor correlates said each resistivity value with the corresponding relative rotational bearing of the transducer and the corresponding time at which each resistivity value is received by the transducer.

16. The electromagnetic imaging assembly of claim 15, wherein said processor correlates said resistivity value with the relative rotational bearing of the transducer and the time at which the resistivity value is received by the transducer to obtain a distance to the borehole wall.

17. An assembly as in claim 15, wherein said depth transducer produces an electrical signal indicative of the amplitude of the induced current.

18. An assembly as in claim 17, further comprising a depth comparator for comparing the electrical signals obtained from said imaging transducer with the electrical signal obtained from said depth transducer, and obtaining a micro-depth measurement of d when a correlation is found.

19. An assembly as in claim 18, wherein said downhole processor monitors said electrical signals obtained from said imaging transducer and prepares a log based upon the relative rotational bearing and depth.

20. An assembly as in claim 19, wherein said downhole processor obtains a dip angle α and a dip direction from said log.

21. An LWD tool for use in a bottomhole drilling assembly, said bottomhole drilling assembly being operable to drill a wellbore through underground formations, comprising:

a first transducer array for receiving waves reflected from the wellbore wall, from which borehole images can be determined;

a second transducer array for receiving waves reflected from the wellbore wall, from which micro-depth can be determined;

a directional sensor for correlating the relative rotational bearing at which the reflected waves are received by said first transducer array and said second transducer array;

a downhole imaging assembly electrically coupled to said first transducer array and to said second transducer array for obtaining electrical signals indicative of said reflected waves, said downhole imaging assembly including;

a comparator for determining a time-of-flight for the reflected waves received by said first transducer array;

a processor for receiving the electrical signals indicative of said reflected waves from said first transducer array and producing a digital signal indicative of the amplitude of said reflected wave; and a correlation device for correlating the electrical signals indicative of said reflected waves from said second transducer array and producing a signal indicative of the micro-depth that the tool moved within the wellbore.

22. An LWD tool as in claim 21, wherein said first array of transducers comprise a plurality of electromagnetic sensors.

23. An LWD tool as in claim 21, wherein said transducers are fired based upon a predetermined time interval.

24. An LWD tool as in claim 21, wherein said first transducer array comprises three acoustic transducers spaced equidistantly around the tool in the same transverse plane, and the reflected wave comprises an acoustic wave.

25. An LWD tool as in claim 24, wherein said second array of transducers comprises an accelerometer with a high dynamic range for measuring acceleration of the bottomhole assembly.

26. An LWD tool as in claim 25, wherein said acceleration measurement is double integrated by said correlation device with respect to time to obtain a micro-depth measurement.

27. An LWD tool as in claim 26, wherein said second array of transducers comprises a plurality of axially aligned acoustic transducers.

28. An LWD tool as in claim 27, wherein said first array of transducers and said second array of transducers share a common transducer.

29. An LWD tool as in claim 28, wherein said second array of transducers includes three depth transducers aligned axially a predetermined distance apart.

30. An LWD tool as in claim 29, wherein each of the three depth transducers generate an acoustic wave and receive the wave reflected from the wellbore wall.

31. An LWD tool as in claim 30, wherein said processor controls the firing of said three depth transducers, and said three depth transducers are fired simultaneously x times for every rotation of the LWD tool.

32. An LWD tool as in claim 31, wherein said depth transducers are fired based upon rotational bearing of the tool within the borehole.

33. An LWD tool as in claim 31, wherein the correlation device correlates the electrical signals obtained from said depth transducers, and when a correlation is found, calculates a micro-depth based upon the predetermined distance between the depth transducers.

34. An LWD tool as in claim 26, wherein said correlation device produces an output signal indicative of micro-depth.

35. An LWD tool as in claim 34, further comprising a processing device for determining if bed boundaries intersect the wellbore based upon electrical signals from one of said imaging transducers indicative of acoustic waves reflected from the wellbore wall.

36. An LWD tool as in claim 35, wherein said processing device performs a correlation routine to determine if said electrical signals from one of said imaging transducers indicate that a bed boundary has intersected the wellbore.

37. An LWD tool as in claim 35, wherein said processing device uses said electrical signals from one of said imaging transducers to prepare an image log based upon the micro-depth measured by said correlation device and the measured rotational bearing.

38. An LWD tool as in claim 37, wherein said processing device applies a best fit sine wave to the image log.

39. An LWD tool as in claim 38, wherein said processing device determines the dip angle $\alpha$ of the bed.

40. An LWD tool as in claim 39, wherein said processing device determines the direction of the dip.

41. An LWD tool as in claim 40, wherein the dip angle $\alpha$ and dip direction are transmitted to the processor.

42. An LWD tool as in claim 41, further comprising a mud pulser unit for receiving signals representing certain formation parameters, and for transmitting a mud pulse to the surface indicative of said parameters.

43. An LWD tool as in claim 42, wherein one of the parameters is dip angle $\alpha$.

44. An LWD tool as in claim 42, wherein one of the parameters is dip direction.

45. An LWD tool as in claim 27, wherein said first transducer array comprise imaging transducers for obtaining an image of the borehole.

46. An LWD tool as in claim 45, wherein said image includes a standoff distance and an amplitude for each reflected acoustic wave.

47. An LWD tool as in claim 46, wherein each of said three transducers generate an acoustic wave and receive the wave reflected from the wellbore wall.

48. An LWD tool as in claim 47, wherein said processor controls the firing of said three transducers.

49. An LWD tool as in claim 48, wherein said three transducers are fired simultaneously x times for every rotation of the LWD tool.

50. An LWD tool as in claim 49, wherein x equals approximately 200.

51. An LWD tool as in claim 49, wherein said transducers are fired based upon a predetermined time interval.

52. An LWD tool as in claim 51, wherein the electrical signals received by said processor are rotationally stamped based upon directional signals received by said processor from said directional sensor.

53. An LWD tool as in claim 49, wherein said transducers are fired based upon rotational bearing of the tool within the borehole.

54. An LWD tool as in claim 53, wherein the electrical signals received by said processor are time stamped based upon clock signals received by said processor from a downhole clock.

55. An LWD tool as in claim 54, wherein the electrical signals received by said processor during a predetermined interval are stacked based upon the relative rotational bearing.

56. An LWD tool as in claim 55, wherein the predetermined interval relates to the distance that the LWD tool moves within the wellbore.

57. An LWD tool as in claim 56, wherein the electrical signals are stacked when the LWD tool moves approximately 1/3".

58. An acoustic logging-while-drilling tool for obtaining an image of the borehole being drilled, and for determining a dip angle $\Theta$ for bed boundaries intersecting the borehole, comprising:

a directional sensor for generating directional signals indicative of rotational bearing and borehole inclination $\Theta$;

imaging transducers for generating acoustic signals and for receiving acoustic signal reflections from the borehole wall to obtain electronic image signals indicative of the borehole and the borehole formation characteristics;

depth transducers for generating acoustic signals and for receiving acoustic signal reflections from the borehole wall to obtain electronic image signals indicative of the borehole and the borehole formation characteristics;

a depth correlation device for correlating the electronic image signals obtained from said depth transducers to determine a correlation between said electronic image signals, and in response to determining a correlation, generating a micro-depth signal indicative of the spacing between the depth transducers; and a dip processor for monitoring the electronic image signals obtained from said imaging transducers to detect the presence of a bed boundary intersecting said borehole, and receiving as input signals the depth signal from said depth correlation device and directional signals from said directional sensor to determine dip angle and dip direction.

59. A tool as in claim 58, wherein the logging tool includes a mud pulser, and said dip processor transmits a signal to said mud pulser indicative of the dip angle and dip direction for transmission to the surface of the wellbore.

60. A tool as in claim 58, wherein said depth correlation device and said dip processor comprise a single digital signal processor.

* * * * *